(12) United States Patent
da Silva et al.

(10) Patent No.: US 12,191,935 B2
(45) Date of Patent: *Jan. 7, 2025

(54) ENHANCEMENTS TO MOBILITY REFERENCE SIGNALS FOR RADIO LINK MONITORING IN A BEAM-BASED SYSTEM

(71) Applicant: Telefonaktiebolaget LM Ericsson (publ), Stockholm (SE)

(72) Inventors: Icaro L. J. da Silva, Solna (SE); Rui Fan, Beijing (CN); Pradeepa Ramachandra, Linköping (SE); Claes Tidestav, Bålsta (SE); Umut Ugurlu, Cambridge (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 675 days.

This patent is subject to a terminal disclaimer.

(21) Appl. No.: 17/021,160

(22) Filed: Sep. 15, 2020

(65) Prior Publication Data

US 2020/0412418 A1 Dec. 31, 2020

Related U.S. Application Data

(63) Continuation of application No. 15/743,569, filed as application No. PCT/SE2017/051102 on Nov. 3, (Continued)

(51) Int. Cl.
*H04B 7/0417* (2017.01)
*H04B 7/0408* (2017.01)
(Continued)

(52) U.S. Cl.
CPC ......... *H04B 7/0417* (2013.01); *H04B 7/0408* (2013.01); *H04B 7/0639* (2013.01);
(Continued)

(58) Field of Classification Search
CPC .................................................. H04B 7/0417
See application file for complete search history.

(56) References Cited

U.S. PATENT DOCUMENTS 10,420,091 B2 9/2019 Feng et al.
10,425,951 B2 9/2019 Mildh et al.
(Continued)

FOREIGN PATENT DOCUMENTS

CN 104054293 A 9/2014
EP 2869478 A1 5/2015
(Continued)

OTHER PUBLICATIONS

3GPP, "3rd Generation Partnership Project; Technical Specification Group Radio Access Network; Evolved Universal Terrestrial Radio Access (E-UTRA); Physical layer procedures (Release 14)", 3GPP TS 36.213 V14.0.0, Sep. 2016, 1-406.
(Continued)

*Primary Examiner* — Jason E Mattis
(74) *Attorney, Agent, or Firm* — Murphy, Bilak & Homiller, PLLC

(57) ABSTRACT

An access node transmits, in a downlink signal having a series of subframes, a beam-formed reference signal in subframes, where the beam-formed reference signals are transmitted in fewer than all of the subframes of the downlink signal. A first subset includes beam-formed reference signals corresponding to a first frequency or first localized range of frequencies, and a second subset includes beam-formed reference signals corresponding to a second frequency or second localized range of frequencies. The second frequency or second localized range of frequencies is spaced apart from and differing from the first frequency or first localized range of frequencies. A user equipment, UE, receives, in the downlink signal, the beam-formed reference signal in each of a plurality of subframes. The UE performs (Continued)

mobility management measurements using at least the first subset of the received beam-formed reference signals and performs RLM using the second subset of the received beam-formed reference signals.

11 Claims, 16 Drawing Sheets

Related U.S. Application Data 2017, now Pat. No. 10,812,155, which is a continuation of application No. PCT/CN2016/104689, filed on Nov. 4, 2016.

(51) Int. Cl.
| | | |
|---|---|---|
| H04B 7/06 | (2006.01) | |
| H04B 7/08 | (2006.01) | |
| H04B 17/318 | (2015.01) | |
| H04L 5/00 | (2006.01) | |
| H04L 25/02 | (2006.01) | |
| H04W 36/00 | (2009.01) | |
| H04W 72/0446 | (2023.01) | |

(52) U.S. Cl.
CPC ......... *H04B 7/0877* (2013.01); *H04B 17/318* (2015.01); *H04L 5/005* (2013.01); *H04L 25/0204* (2013.01); *H04W 36/0085* (2018.08); *H04W 72/0446* (2013.01)

(56) References Cited

U.S. PATENT DOCUMENTS

| | | | |
|---|---|---|---|
| 10,812,155 B2* | 10/2020 | da Silva | H04B 7/0417 |
| 2012/0182895 A1 | 7/2012 | Jwa et al. | |
| 2013/0059610 A1* | 3/2013 | Siomina | H04W 24/10 |
| | | | 455/456.6 |
| 2013/0301542 A1 | 11/2013 | Krishnamurthy et al. | |
| 2014/0146863 A1 | 5/2014 | Seol et al. | |
| 2014/0204825 A1 | 7/2014 | Ekpenyong et al. | |
| 2014/0269368 A1 | 9/2014 | Xu et al. | |
| 2015/0296487 A1* | 10/2015 | Takeda | H04W 36/0079 |
| | | | 370/329 |
| 2016/0006549 A1 | 1/2016 | Kim et al. | |
| 2016/0219569 A1 | 7/2016 | Kuo et al. | |
| 2016/0249269 A1 | 8/2016 | Niu et al. | |
| 2017/0033904 A1* | 2/2017 | Stirling-Gallacher | |
| | | | H04L 5/0023 |
| 2017/0150384 A1 | 5/2017 | Rune et al. | |
| 2017/0208494 A1 | 7/2017 | Moon et al. | |
| 2017/0325244 A1 | 11/2017 | Zhang et al. | |
| 2017/0332371 A1 | 11/2017 | Kubota et al. | |
| 2017/0339704 A1 | 11/2017 | Matsumoto et al. | |
| 2018/0049204 A1* | 2/2018 | Nory | H04W 48/12 |
| 2018/0084446 A1 | 3/2018 | Li et al. | |
| 2018/0092054 A1 | 3/2018 | Azarian Yazdi et al. | |
| 2018/0309495 A1* | 10/2018 | Xiong | H04B 7/088 |
| 2018/0310283 A1 | 10/2018 | Deenoo et al. | |
| 2018/0376359 A9 | 12/2018 | Kim et al. | |
| 2020/0083994 A1 | 3/2020 | Marinier et al. | |

FOREIGN PATENT DOCUMENTS

| | | |
|---|---|---|
| JP | 2016508346 A | 3/2016 |
| RU | 2518405 C2 | 6/2014 |
| RU | 2529554 C2 | 9/2014 |
| RU | 2593394 C1 | 8/2016 |
| WO | 2013173023 A1 | 11/2013 |

OTHER PUBLICATIONS

3GPP, "3rd Generation Partnership Project; Technical Specification Group Radio Access Network; Evolved Universal Terrestrial Radio Access (E-UTRA); User Equipment (UE) conformance specification Radio transmission and reception Part 1: Conformance Testing; (Releas", 3GPP TS 36.521-1 V14.0.0, Sep. 2016, 1-3733.

Unknown, Author, "Beam-based aspects for New Radio", InterDigital Communications, 3GPP TSG-RAN \VG2 #95-BIS, R2-167137, Kaohsiuug, Taiwan,, Oct. 10-14, 2016, 1-4.

Unknown, Author, "Consideration on the RRM Measurement for NR", 3GPP TSG-RAN WG2 Meeting #95bis, R2-166337, Kaohsiung, Oct. 10-14, 2016, 1-4.

Unknown, Author, "Future proofness and energy efficiency", Ericsson, 3GPP TSG-RAN WG2 #94, R2-163994, Nanjing, P.R. China, May 23-27, 2016, 1-4.

Unknown, Author, "Measurement for Mobility and Beam Procedure in NR", 3GPP TSG RAN WG1 Meeting #86bis, R1-1609268, LG Electronics, Lisbon, Portugal, Oct. 10-14, 2016, 1-6.

Unknown, Author, "Mobility based on DL and UL measurements", Ericsson, 3GPP TSG-RAN WG2 #94, R2-163999, Nanjing, China, May 23-27, 2016, 1-3.

Unknown, Author, "Mobility execution in NR", Ericsson, 3GPP TSG-RAN WG2 #94, R2-164000, Nanjing, China, May 23-27, 2016, May 23-27, 2016, 1-2.

Unknown, Author, "Mobility measurements and procedures", Ericsson, 3GPP TSG-RAN WG2 #94, R2-164001, Nanjing, P.R. China, May 23-27, 2016, 1-5.

Unknown, Author, "Network controlled Mobility for NR", Ericsson, 3GPP TSG-RAN WG2 #94, R2-164002, Nanjing, P.R. China, May 23-27, 2016, 1-2.

Unknown, Author, "New SID Proposal: Study on New Radio Access Technology", 3GPP TSG RAN Meeting #71, RP-160671, Goteborg, NTT Docomo, Mar. 7-10, 2016, 1-8.

Unknown, Author, "Operation in higher frequencies", Ericsson, 3GPP TSG-RAN WG2 #94, R2-163995, Nanjing, P.R. China, May 23-27, 2016, 1-4.

\* cited by examiner

800

802
CONFIGURE A WIRELESS DEVICE TO PERFORM MOBILITY MANAGEMENT MEASUREMENTS USING AT LEAST A FIRST SUBSET OF BEAM-FORMED REFERENCE SIGNALS AND TO PERFORM RADIO LINK MONITORING USING AT LEAST A SECOND SUBSET OF BEAM-FORMED REFERNCE SIGNALS

804
TRANSMIT, IN A DOWNLINK SIGNAL HAVING A SERIES OF SUBFRAMES, A BEAM-FORMED REFERENCE SIGNAL IN EACH OF A PLURALITY OF SUBFRAMES, WHEREIN THE BEAM-FORMED REFERENCE SIGNALS ARE TRANSMITTED IN FEWER THAN ALL OF THE SUBFRAMES OF THE DOWNLINK SIGNAL, AND WHEREIN THE BEAM-FORMED REFERENCE SIGNALS INCLUDE A FIRST SUBSET AND AN AT LEAST PARTLY DIFFERING SECOND SUBSET, THE FIRST SUBSET INCLUDING BEAM-FORMED REFERENCE SIGNALS CORRESPONDING TO A FIRST FREQUENCY OR FIRST LOCALIZED RANGE OF FREQUENCIES, AND THE SECOND SUBSET INCLUDING BEAM-FORMED REFERENCE SIGNALS CORRESPONDING TO A SECOND FREQUENCY OR SECOND LOCALIZED RANGE OF FREQUENCIES, THE SECOND FREQUENCY OR SECOND LOCALIZED RANGE OF FREQUENCIES BEING SPACED APART FROM AND DIFFERING FROM THE FIRST FREQUENCY OR FIRST LOCALIZED RANGE OF FREQUENCIES

*FIG. 8*

ENHANCEMENTS TO MOBILITY REFERENCE SIGNALS FOR RADIO LINK MONITORING IN A BEAM-BASED SYSTEM

TECHNICAL BACKGROUND

The present disclosure is generally related to wireless communications systems, and is more particularly related to access nodes that configure wireless devices to perform radio link monitoring (RLM) in such systems.

BACKGROUND

Radio Link Monitoring (RLM) in LTE

The Long-Term Evolution (LTE) wireless system developed by the 3rd-Generation Partnership Project (3GPP) is a widely deployed fourth-generation wireless communications system. In LTE and its predecessor systems, the purpose of the RLM function in a wireless device, referred to in 3GPP documentation as a "user equipment," or "UE," is to monitor the downlink radio link quality of the serving cell in RRC_CONNECTED mode. This monitoring is based on Cell-Specific Reference Signals (CRSs), which are always associated to a given LTE cell and are derived from the Physical Cell Identifier (PCI). RLM in turn enables the UE, when in RRC_CONNECTED mode, to determine whether it is in-sync or out-of-sync with respect to its serving cell, as described in 3GPP TS 36.213, v14.0.0.

The UE's estimate of the downlink radio link quality, based on its measurements of the CRS, is compared with out-of-sync and in-sync thresholds, Qout and Qin respectively, for the purposes of RLM. These thresholds are standardized in terms of the Block Error Rate (BLER) of a hypothetical Physical Downlink Control Channel (PDCCH) transmission from the serving cell. Specifically, Qout corresponds to a 10% BLER, while Qin corresponds to a 2% BLER. The same threshold levels are applicable whether Discontinuous Reception (DRX) is in use or not.

The mapping between the CRS-based downlink quality and the hypothetical PDCCH BLER is up to the UE implementation. However, the performance is verified by conformance tests defined for various environments, as described in 3GPP TS 36.521-1, v14.0.0. Also, the downlink quality is calculated based on the Reference Signal Receive Power (RSRP) of CRS over the whole band, as illustrated in FIG. 1, since PDCCH is transmitted over the whole band.

When no DRX is configured, out-of-sync occurs when the downlink radio link quality estimated over the last 200-millisecond period becomes worse than the threshold Qout. Similarly, without DRX, the in-sync occurs when the downlink radio link quality estimated over the last 100-millisecond period becomes better than the threshold Qin. Upon detection of out-of-sync, the UE initiates the evaluation of in-sync. The occurrences of out-of-sync and in-sync are reported internally by the UE's physical layer to its higher layers, which in turn may apply layer 3 (i.e., higher layer) filtering for the evaluation of Radio Link Failure (RLF). The higher-layer RLM procedure is illustrated in FIG. 2.

When DRX is in use, the out-of-sync and in-sync evaluation periods are extended, to enable sufficient UE power saving, and depend upon the configured DRX cycle length. The UE starts in-sync evaluation whenever out-of-sync occurs. Therefore, the same period (TEvaluate_Qout_DRX) is used for the evaluation of out-of-sync and in-sync. However, upon starting the RLF timer (T310) until its expiry, the in-sync evaluation period is shortened to 100 milliseconds, which is the same as without DRX. If the timer T310 is stopped due to N311 consecutive in-sync indications, the UE performs in-sync evaluation according to the DRX based period (TEvaluate_Qout_DRX).

The whole methodology used for RLM in LTE (i.e., measuring the CRS to "estimate" the PDCCH quality) relies on the assumption that the UE is connected to an LTE cell, a single connectivity entity transmitting both PDCCH and CRSs.

5G Development

In a study item for the new 5G radio access technology, entitled New Radio (NR), companies have reached initial agreements on the following design principles: ultra-lean design for NR; and massive usage of beamforming. Companies have expressed the view that beamforming should be taken into account when RLM is designed, which is not the case in LTE. In addition, concerns have been expressed regarding how the UE should measure the quality of a cell.

Following are some of the principles of NR that may drive the need for new solutions for RLM, compared to the existing solution in LTE. Also described are some aspects of the beam-based mobility solution for NR using RRC signaling across transmission receiving points (TRPs) that are unsynchronized and/or not sharing the same baseband and/or linked via non-ideal backhaul.

Ultra-Lean Design in 5G NR

NR is expected to be an ultra-lean system, which implies a minimization of always-on transmissions, aiming for an energy efficient future-proof system. Early agreements in 3GPP show that this principle has been endorsed and there is a common understanding that NR should be a lean system. In RAN1#84bis, RAN1 agreed, regarding ultra-lean design, that NR shall strive for maximizing the amount of time and frequency resources that can be flexibly utilized or left blanked, without causing backward compatibility issues in the future. Blank resources can be used for future use. NR shall also strive for minimizing transmission of always-on signals and confining signals and channels for physical layer functionalities (signals, channels, signaling) within a configurable/allocable time/frequency resource.

Beamforming in 5G NR

There is a common understanding that NR will consider frequency ranges up to 100 GHz. In comparison to the current frequency bands allocated to LTE, some of the new bands will have much more challenging propagation properties such as lower diffraction and higher outdoor/indoor penetration losses. Consequently, signals will have less ability to propagate around corners and penetrate walls. In addition, in high frequency bands, atmospheric/rain attenuation and higher body losses render the coverage of NR signals even spottier. Fortunately, operation in higher frequencies makes it possible to use smaller antenna elements, which enables antenna arrays with many antenna elements. Such antenna arrays facilitate beamforming, where multiple antenna elements are used to form narrow beams and thereby compensate for the challenging propagation properties. For these reasons, it is widely accepted that NR will rely on beamforming to provide coverage, which means that NR is often referred to as a beam-based system.

It is also known that different antenna architectures should be supported in NR: analog, hybrid and digital. This implies some limitations in terms of how many directions can be covered simultaneously, especially in the case of analog/hybrid beamforming. To find a good beam direction at a given transmission point (TRP)/access node/antenna array, a beam-sweep procedure is typically employed. A typical example of a beam-sweep procedure is that the node points a beam containing a synchronization signal and/or a beam identification signal, in each of several possible directions, one or few direction(s) at a time. This is illustrated in FIG. 3, where each of the illustrated lobes represents a beam, and where the beams may be transmitted consecutively, in a sweeping fashion, or at the same time, or in some combination. If the same coverage properties apply to both a synchronization signal and beam identification signal in each beam, the UE can not only synchronize to a TRP but also gain the best beam knowledge at a given location.

As described above, common signals and channels in LTE are transmitted in an omnidirectional manner, i.e., without beamforming. In NR, with the availability of many antennas at the base station and the different ways they can be combined to beamform signals and channels, that assumption, as made in LTE, may no longer be valid. The major consequence of that design principle of NR beamforming is that while in LTE it was quite clear that the CRSs' quality could be used to estimate the quality of PDCCH, in NR this becomes unclear, due to the different ways channels and reference signals can be beamformed. In other words, it cannot be assumed as a general matter that any particular reference signal will be transmitted in the same manner as the PDCCH is transmitted. This ambiguity from the UE's point of view is due to the fact that reference signals and channels can be transmitted by the network via different kinds of beamforming schemes, which are typically determined based on real-time network requirements. These requirements may include, for example, different tolerance levels to radio overhead due to reference signals versus control channels, or different coverage requirements for reference signals versus control channels.

Despite these challenges from NR design principles, an NR UE in connected mode still needs to perform RLM, to verify whether its cell quality is still good enough, so that the UE can be reached by the network. Otherwise, higher layers should be notified, and UE autonomous actions should be triggered.

Mobility Reference Signal in NR: 3GPP Agreements

In 3GPP discussions, certain aspects have been agreed to for mobility reference signals (MRSs), which are used by the UE in NR for measurements related to mobility (e.g., handover, or HO). For downlink-based mobility in RRC_CONNECTED mode involving radio resource control (RRC) and beams, the UE measures at least one or more individual beams, and the gNB (3GPP terminology for an NR base station) should have mechanisms to consider those beams to perform HO. This is necessary at least to trigger inter-gNB handovers and to avoid HO ping-pongs/HO failures. It is to be determined whether UEs will report individual and/or combined quality of multiple beams. The UE should also be able to distinguish between the beams from its serving cell and beams from non-serving cells for Radio Resource Management (RRM) measurements in active mobility. The UE should be able to determine whether a beam is from its serving cell. It is yet to be determined whether serving/non-serving cell may be termed "serving/non-serving set of beams," whether the UE is informed via dedicated signaling or implicitly detected by the UE based on some broadcast signals, how the cell in connected mode relates to the cell in idle mode, and how to derive a cell quality based on measurements from individual beams.

Multiple solutions for the specific design of the MRS are being considered, but in any of these, the UE performs RRM measurements within its serving cell via a set of MRSs. The UE is aware of the specific MRS that belongs to its serving cell, so that all other reference signals the UE may detect are assumed to be neighbors.

The transmission strategy for reference signals like MRSs can utilize the freedom in time and/or frequency and/or the code/sequence dimension. By transmitting the reference signals for different beams in orthogonal resources, the network can obtain distinct measurement reports corresponding to these signals from the UE corresponding to the orthogonal reference signals.

SUMMARY

As described above, RLM in LTE is based on CRSs, where a wide-band signal is transmitted in all subframes. A major consequence of the lean-design principle with respect to the RLM design in NR is that there is a wish to avoid the design of wide-band signals transmitted in all subframes. Therefore, lean design will prohibit the usage of the same LTE solution for RLM in NR.

Described in detail below are techniques by which a wireless device (e.g., UE) can measure its serving cell quality where a cell is transmitting signals in a beamforming manner in a lean design, i.e., without always-on reference signals transmitted in the whole band and across all subframes.

According to some embodiments, a method in a user equipment, UE, includes receiving, in a downlink signal having a series of subframes, a beam-formed reference signal in each of a plurality of subframes, where the beam-formed reference signals are received in fewer than all of the subframes of the downlink signal. The method also includes performing mobility management measurements using at least a first subset of the received beam-formed reference signals, the first subset corresponding to a first frequency or first localized range of frequencies. The method further includes performing RLM using a second subset of the received beam-formed reference signals. The second subset is at least partly differing from the first subset and includes beam-formed reference signals corresponding to a second frequency or second localized range of frequencies. The second frequency or second localized range of frequencies is spaced apart from and differing from the first frequency or first localized range of frequencies. The series of subframes of the downlink signal may carry one or more control channels.

According to some embodiments, a method in an access node of a wireless communications system includes transmitting, in a first downlink signal having a series of subframes, a beam-formed reference signal in each of a plurality of subframes, where the beam-formed reference signals are transmitted in fewer than all of the subframes of the downlink signal. The first subset includes beam-formed reference signals corresponding to a first frequency or first localized range of frequencies, and the second subset includes beam-formed reference signals corresponding to a second frequency or second localized range of frequencies. The second frequency or second localized range of frequencies is spaced apart from and differing from the first frequency or first localized range of frequencies. The method also includes configuring a UE to perform mobility management measurements using at least the first subset of the beam-formed reference signals and to perform RLM using at least the second subset of the beam-formed reference signals. In some embodiments, this configuring is performed prior to the transmitting. In some embodiments, the transmitting may include transmitting a first control channel using the same beamforming parameters used to transmit the beam-formed reference signals.

According to some embodiments, a UE configured for operation in a wireless communication network includes transceiver circuitry and processing circuitry operatively associated with the transceiver circuitry. The processing circuitry is configured to receive, in a downlink signal having a series of subframes, a beam-formed reference signal in each of a plurality of subframes, where the beam-formed reference signals are received in fewer than all of the subframes of the downlink signal. The processing circuitry is also configured to perform mobility management measurements using at least a first subset of the received beam-formed reference signals, the first subset corresponding to a first frequency or first localized range of frequencies. The processing circuitry is also configured to perform RLM using a second subset of the received beam-formed reference signals. The second subset is at least partly differing from the first subset and includes beam-formed reference signals corresponding to a second frequency or second localized range of frequencies. The second frequency or second localized range of frequencies is spaced apart from and differing from the first frequency or first localized range of frequencies.

According to some embodiments, an access node of a wireless communications system includes transceiver circuitry and processing circuitry operatively associated with the transceiver circuitry. The processing circuitry is configured to transmit, in a first downlink signal having a series of subframes, a beam-formed reference signal in each of a plurality of subframes, where the beam-formed reference signals are transmitted in fewer than all of the subframes of the downlink signal. The beam-formed reference signals include a first subset and an at least partly differing second subset, the first subset including beam-formed reference signals corresponding to a first frequency or first localized range of frequencies, and the second subset including beam-formed reference signals corresponding to a second frequency or second localized range of frequencies. The second frequency or second localized range of frequencies is spaced apart from and differing from the first frequency or first localized range of frequencies. The processing circuitry is configured to configure a UE to perform mobility management measurements using at least the first subset of the beam-formed reference signals and to perform RLM using at least the second subset of the beam-formed reference signals. In some embodiments, the processing circuitry is further configured to transmit a first control channel using the same beamforming parameters used to transmit the beam-formed reference signals.

Further aspects of the present invention are directed to an apparatus, computer program products or computer-readable storage medium corresponding to the methods summarized above and functional implementations of the above-summarized apparatus and UE.

Advantages of the embodiments disclosed herein may include the following. Rather than creating a large overhead by transmitting reference signals used for mobility management (i.e., MRSs) over more frequency resources, the RLM periodicity requirements can be larger than the mobility requirements such that replicated versions of the MRS transmitted for RLM purposes are transmitted even more sparsely than the MRS transmitted for mobility purposes, further reducing the overhead and/or the static interference. This can be switched off once there are no active UEs in the cell. The network can also ensure that UEs can make more accurate RLM measurements over a large range of time-frequency resources, without introducing a dedicated and static/always-on periodic reference signal (RS) in the network.

Additional advantages include that the signaling overhead can be maintained at a low level, without compromising the accuracy of RLM measurements, especially during data inactivity. This can be a crucial requirement in 5G NR. The network can also ensure that the RLM function can be maintained reliably for a control channel design without falling back to a wider beam, as it can be essential to transmit the control channel on a narrow UE-specific beam for improved coverage at high carrier frequencies.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE FIGURES

FIG. 8 illustrates a method in the network node, according to some embodiments.

DETAILED DESCRIPTION

Figure 1:
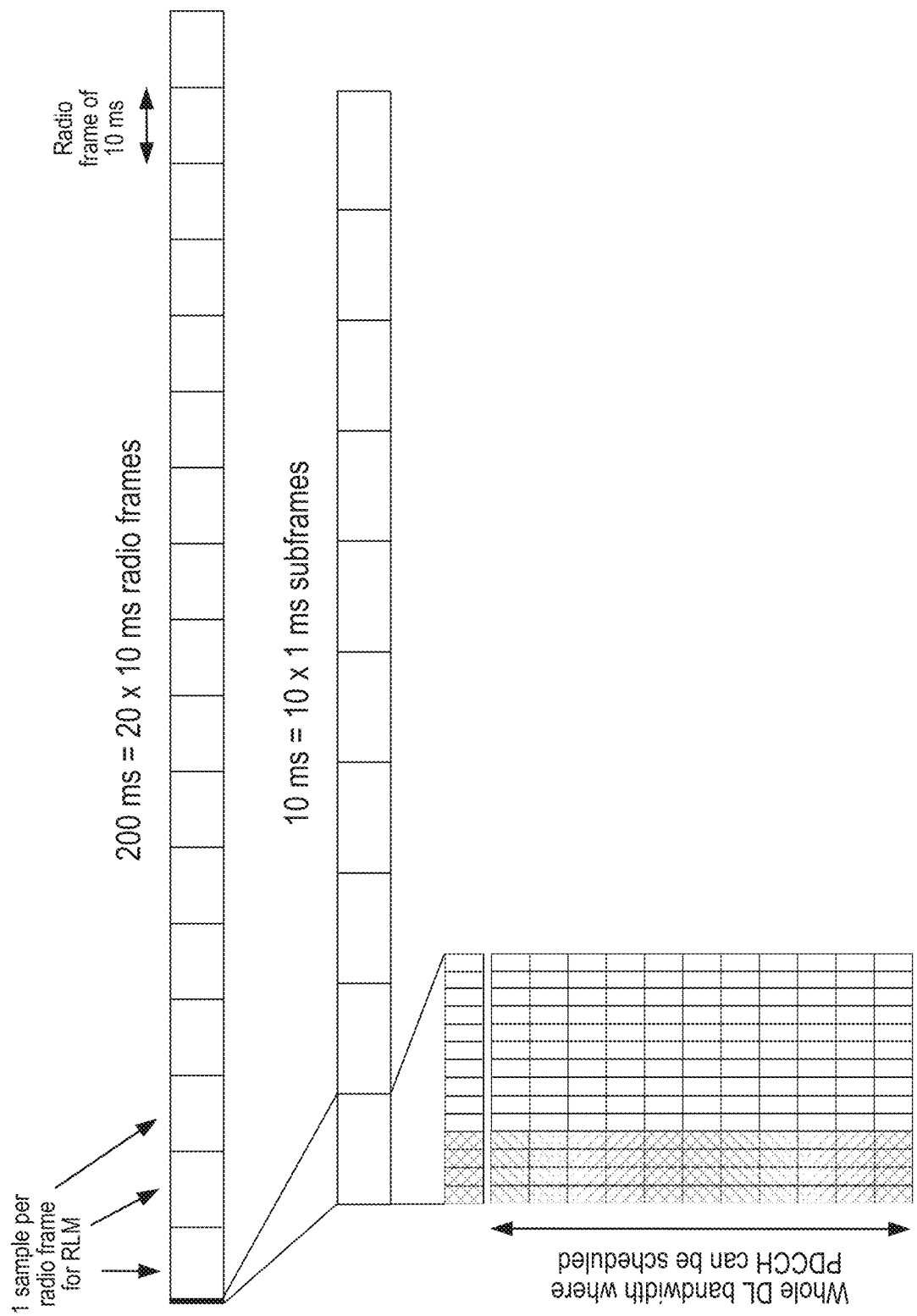
FIG. 1 illustrates how PDCCH can be scheduled anywhere over the whole downlink transmission bandwidth.
Figure 2:
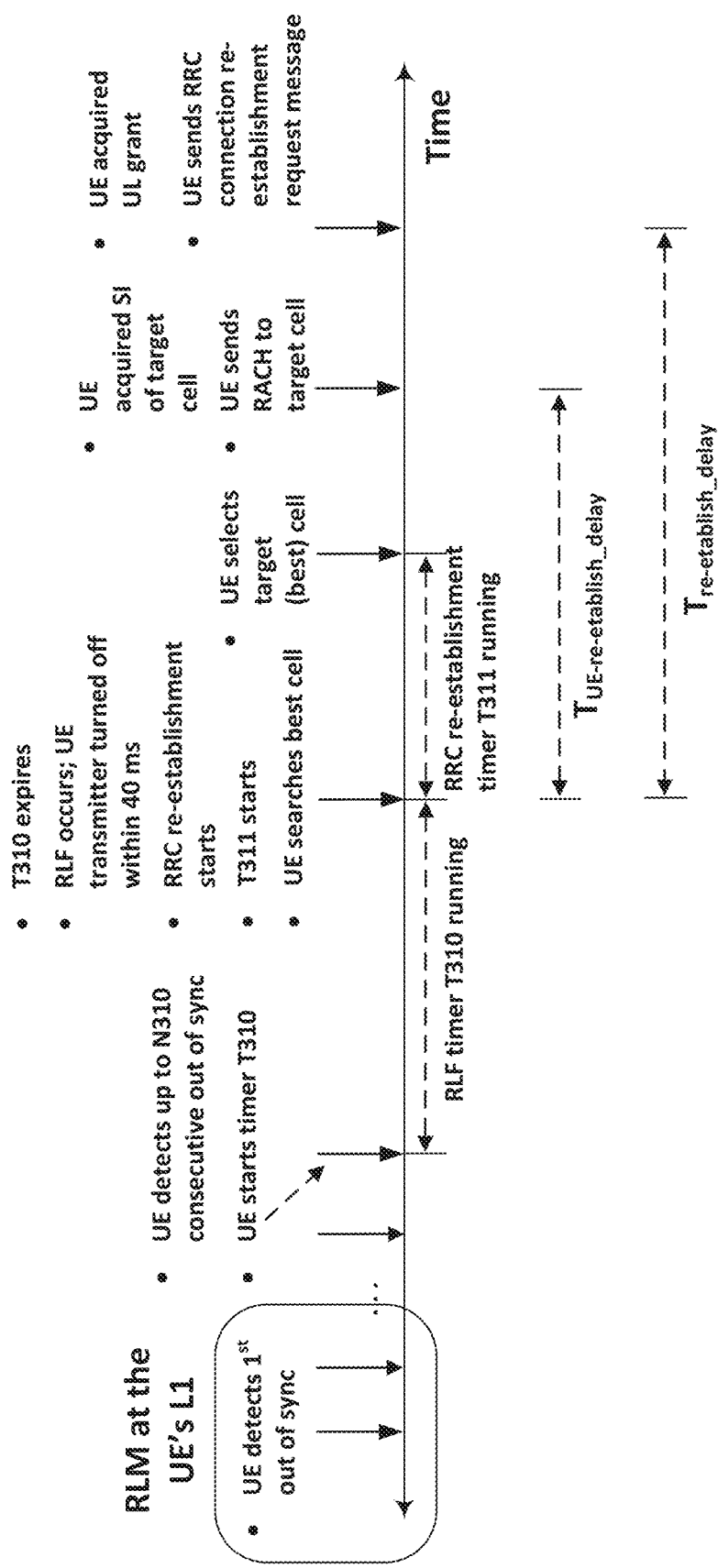
FIG. 2 illustrates higher layer RLM procedures in LTE.
Figure 3:
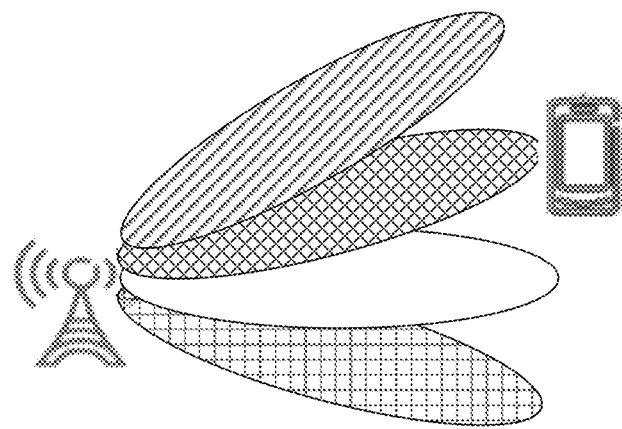
FIG. 3 illustrates a beam sweeping procedure.
Figure 4:
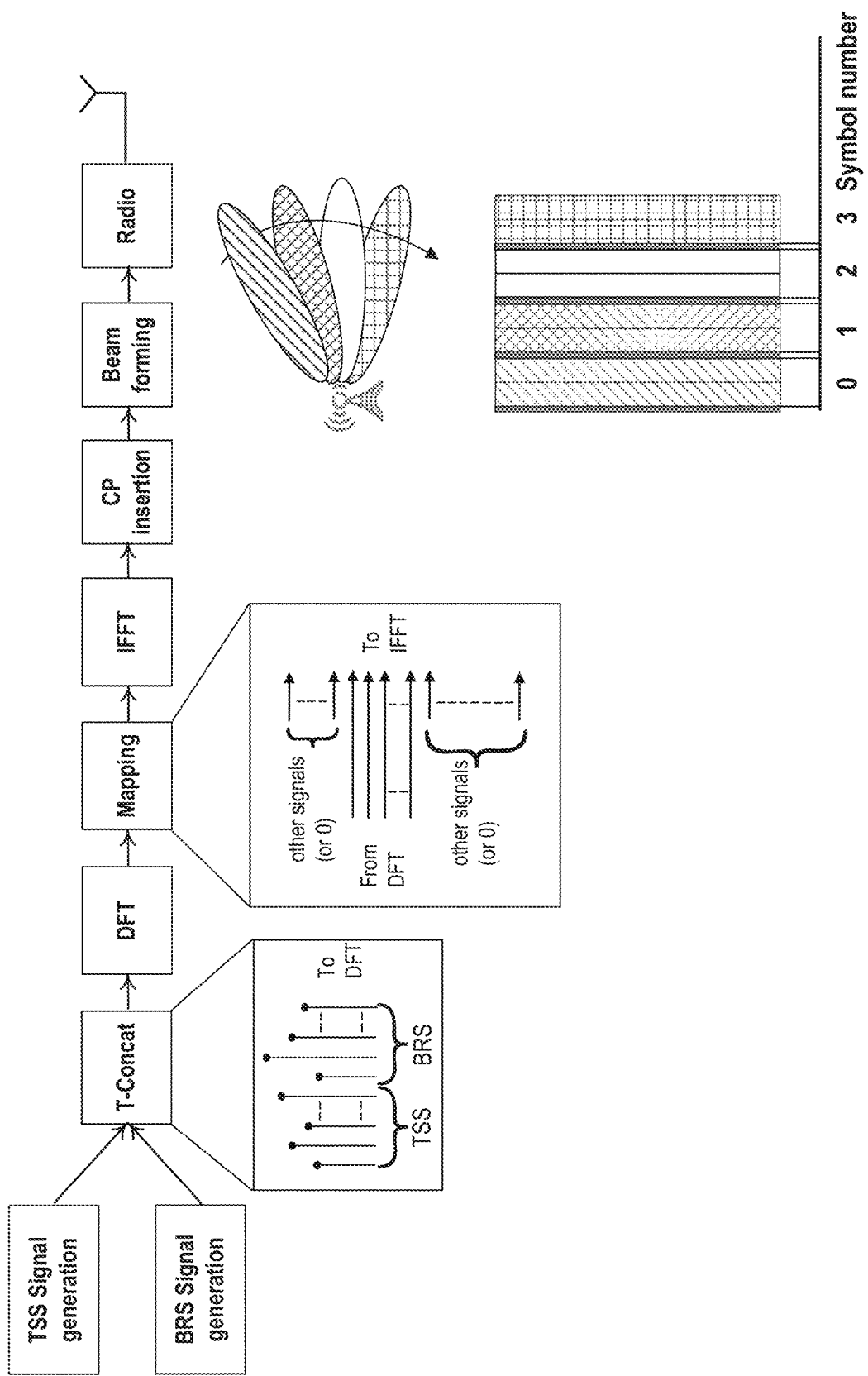
FIG. 4 illustrates the generation of a single MRS.
Figure 5:
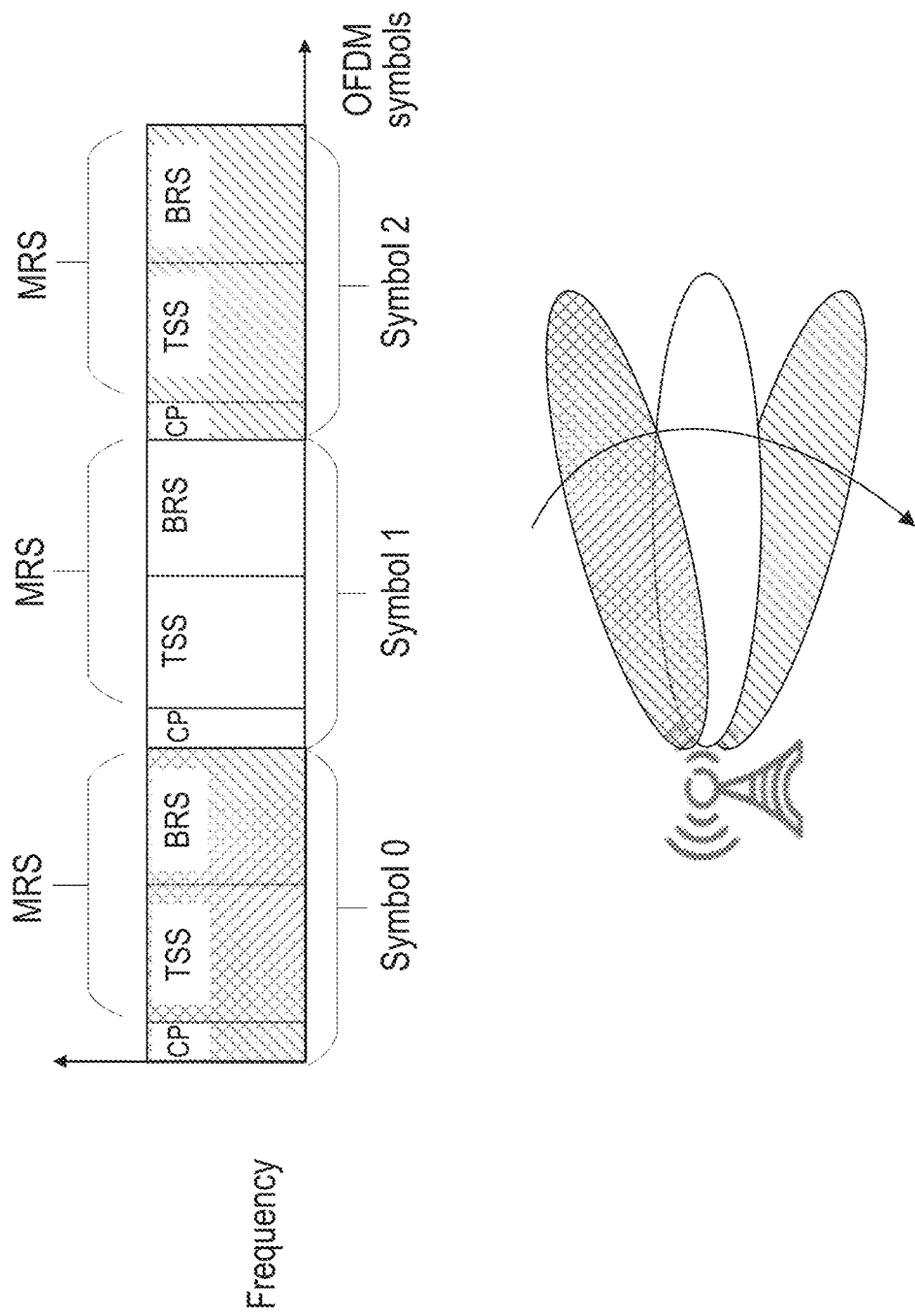
FIG. 5 illustrates an MRS design in time and frequency domains.

An example system may include a UE and a network radio access node, where a wireless device, i.e., a UE, performs RLM in a system with beamforming by performing RRM measurements based on the same periodic reference signals configured to support connected mode mobility (MRSs).

In the context of the present disclosure, "performing RLM" means performing RRM measurements and comparing the value of a given metric, e.g., a signal-to-interference-plus-noise ratio (SINR), with a threshold that represents the downlink control channel quality under the assumption that the control channel would have been transmitted in the same manner, i.e., with similar beamforming properties and/or similar or representative frequency resources.

The measurements over the RSs used for RLM should be correlated with the quality of the downlink (DL) control channel (e.g., PDCCH or ePDCCH in LTE) from which the network is supposed to contact the UE (e.g., by sending scheduling information), despite the fact that different RSs can be used to estimate the downlink control channel and decode the control information. For example, the UE can use the same MRS to perform RLM while the PDCCH decoding is done using UE-specific demodulation RSs (DMRSs). One aspect of this system is that the network guarantees the correlation of the quality of the serving cell MRS(s) and the quality of the downlink control channel(s). This can be done at the network side by beamforming the downlink control channel information with the same beamforming configuration (e.g., direction, beam width, power distribution, same antenna panel, etc.) used for transmitting the MRSs configured for that UE. Note that as used herein, the terms "MRS" and "mobility reference signal" are used to refer to reference signals configured to and/or used to support connected mode mobility, i.e., for measurement by UEs to determine when handovers to other beams and/or cells may occur. It will be appreciated that some or all of these reference signals may be used for other purposes as well, and these reference signals may be known by other names.

For the MRSs transmitted in one or several beams, different embodiments can define the information the signal carries, e.g., in terms of the identifiers, in various ways. In some embodiments, for example, different RSs are transmitted in each beam, and each one carries its own beam identifier (BID). In this case, the reference signals can be called beam-specific RS (BRS), and the UE can perform RLM on a per-beam basis, i.e., measuring a quality metric, e.g., an RSRP or SINR per individual beam that is equivalent to the quality of the transmission of the downlink control channel in that specific beam. In other embodiments, the same RSs may be transmitted in each of the beams, where each one carries the same identifier. This identifier can either be a BID, a group identifier that can be a cell identifier Cell ID (CID) or both a beam ID+cell ID. In these embodiments, the UE may distinguish beams in the time domain, and/or simply perform some averaging over beams carrying the same identifier.

Figure 6:
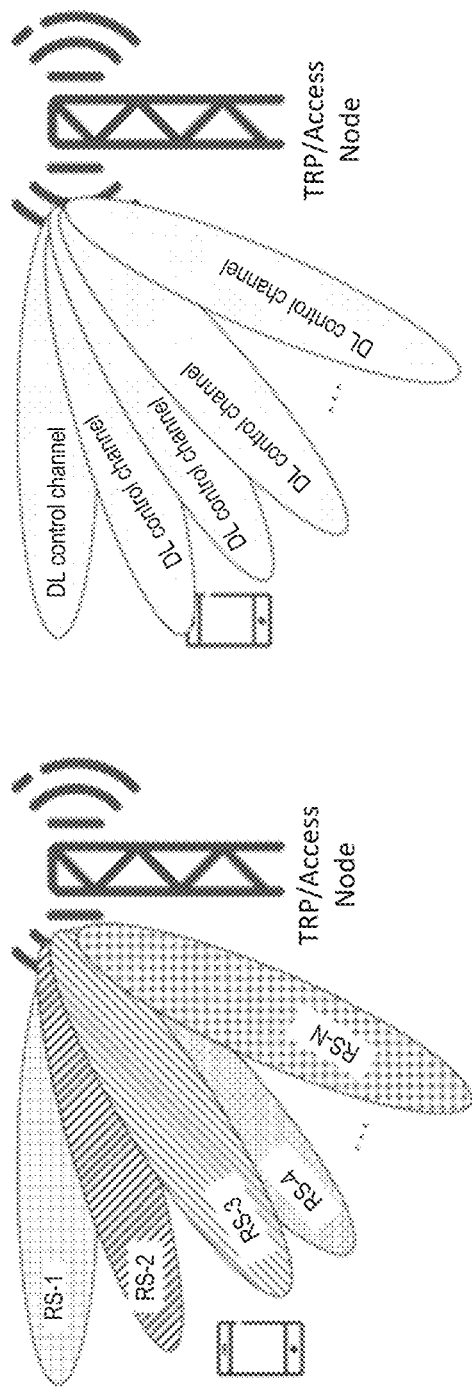
FIG. 6 illustrates the principles of a reference signal transmission that facilitates RLM procedures described herein, according to some embodiments.

FIG. 6 illustrates the principles of a reference signal transmission that facilitate the RLM procedures described herein. As seen on the left-hand side of FIG. 6, each beam carries RSs that are configured to the wireless device (e.g., UE) for mobility purposes. These reference signals are referred to as mobility reference signals or MRSs herein, though they may not necessarily carry that name. What is meant by "configured to the UE" is that a UE in RRC_CONNECTED mode is provided with information regarding measurements and reporting conditions, with respect to serving cell/beam signals and/or non-serving cell/beam signals. These RSs may carry a BID, a beam ID plus a group ID (which may be understood as a cell ID, for example), or simply a group ID, in various embodiments. As seen on the right-hand side of FIG. 6, a downlink control channel, e.g., a PDCCH, is transmitted using the same beamforming properties as the RSs that are used for mobility purposes. This may be understood as transmitting the downlink control channel in the "same beam" as the RSs, even if transmitted at different times. Note that the downlink control channel can carry (or be associated with) different RSs for channel estimation and channel decoding purposes. These can be, but are not necessarily, completely separate from the ones used for mobility, and may be cell-specific, UE-specific, and/or beam-specific, in various embodiments.

Given the approach shown in FIG. 6, it will be understood that RLM can be carried out on the MRSs, i.e., the RSs RS-1 to RS-N, since because the downlink control channel is beamformed in the same way as the MRSs, the measured quality of the MRSs will directly correspond to a quality of the downlink control channel. Thus, thresholds for in-sync and out-of-sync detection can be utilized in the same way as in LTE.

However, in order to fulfill requirements for RRM measurements, these MRSs have been envisioned to be narrow band signal (e.g., 6 central physical resource blocks (PRBs)). On the other hand, the downlink control channel can either be transmitted in the whole band (as LTE PDCCH) or localized/distributed (as LTE ePDCCH and the downlink control channel design in NR).

In the case of localized downlink control channels, i.e., where the control channels are transmitted within a relatively small bandwidth, compared to the available bandwidth, such that frequency selectivity of the radio channel is insignificant, the system may transmit MRSs in some representative physical resource blocks (PRBs) whose quality is correlated with the quality of the PRBs where the downlink control channel is transmitted for the UE. However, in the case of non-localized/distributed downlink control channels, i.e., where the control channels are transmitted using resource elements that are spread over the available bandwidth, so as to exploit frequency diversity, that technique may provide some inaccuracies in the sense that while the MRS bandwidth is confined to a limited number of PRBs, the downlink control channel frequency of the UE may extend to much wider bandwidths so that there might be a limited accuracy of the downlink control channel quality estimation based on the MRSs.

Embodiments of the present invention provide a technique where the UE performs RLM in a system with beamforming by performing RRM measurements based on a new signal that is a version of the same periodic reference signals configured to support connected mode mobility (MRSs), but repeated in the frequency domain in the same frequency resources as the downlink control channel of a given UE would be transmitted. These multiple versions of the mobility RSs may also be transmitted in different subframes in order to provide some additional time domain diversity and/or to enable the beamforming transmission to be equivalent.

For example, a method includes performing RLM based on multiple replicas of MRSs, but repeated over multiple frequency resources equivalent to the frequency resources where the UE's downlink control channels would be transmitted (instead of a single set of resource blocks). At the network side, the radio access node transmits downlink control channel information in the same way it transmits the reference signals to be reused for RLM purposes.

In the following, concepts in accordance with exemplary embodiments of the invention will be explained in more detail and with reference to the accompanying drawings. The illustrated embodiments relate to radio link monitoring in such a wireless communication network, as performed by wireless devices, in the following also referred to as UEs, and access nodes. The wireless communication network may for example be based on a 5G radio access technology (RAT), such as an evolution of the LTE RAT or the 3GPP New Radio (NR). However, it is to be understood that the illustrated concepts could also be applied to other RATs.

Figure 7:
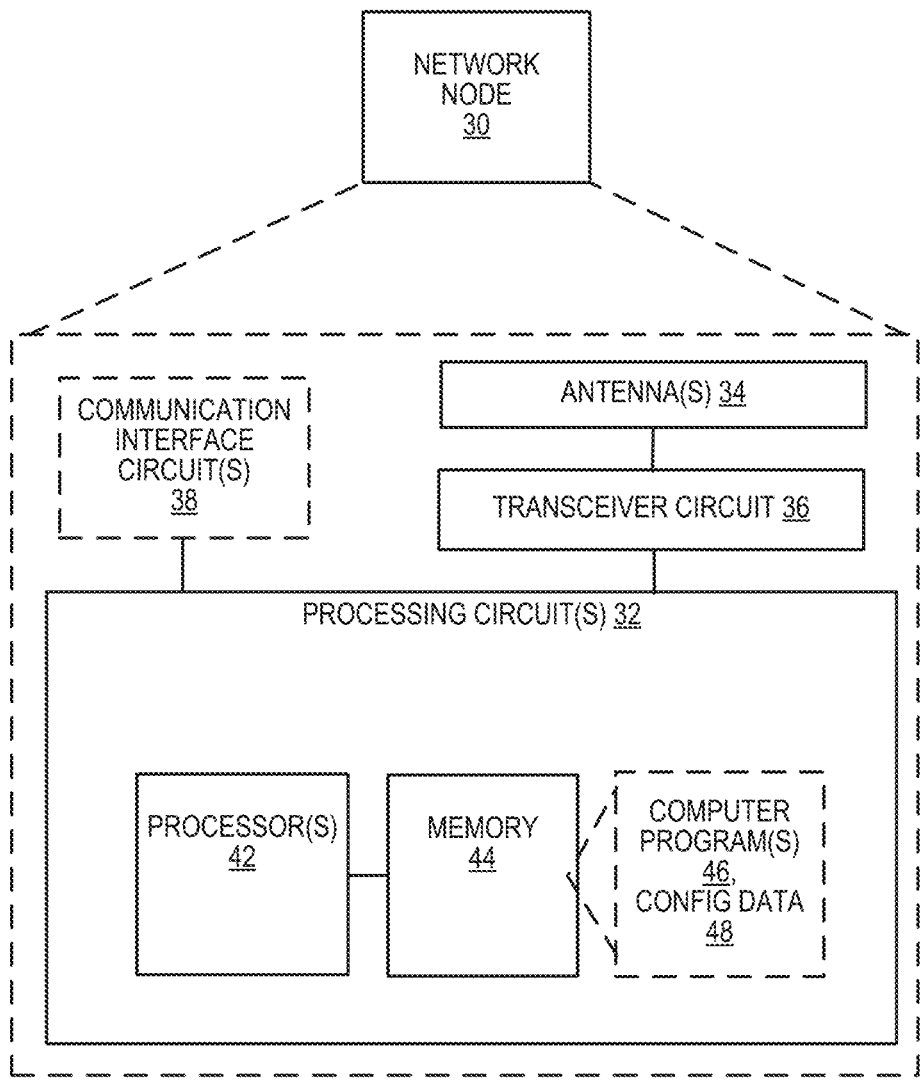
FIG. 7 is a block diagram of a network node, according to some embodiments.

FIG. 7 illustrates a diagram of a network node 30 that may be configured to carry out one or more of the disclosed techniques. The network node 30 can be any kind of network node that may include a network access node such as a base station, radio base station, base transceiver station, evolved Node B (eNodeB), Node B, gNodeB, or relay node. In the non-limiting embodiments described below, the network node 30 will be described as being configured to operate as a cellular network access node in an NR network.

Those skilled in the art will readily appreciate how each type of node may be adapted to carry out one or more of the methods and signaling processes described herein, e.g., through the modification of and/or addition of appropriate program instructions for execution by processing circuits 32.

The network node 30 facilitates communication between wireless terminals, other network access nodes and/or the core network. The network node 30 may include a communication interface circuit 38 that includes circuitry for communicating with other nodes in the core network, radio nodes, and/or other types of nodes in the network for the purposes of providing data and/or cellular communication services. The network node 30 communicates with UEs using antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication services.

The network node 30 also includes one or more processing circuits 32 that are operatively associated with the transceiver circuit 36 and, in some cases, the communication interface circuit 38. For ease of discussion, the one or more processing circuits 32 are referred to hereafter as "the processing circuit 32" or "the processing circuitry 32." The processing circuit 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 42 may be multi-core, i.e., having two or more processor cores utilized for enhanced performance, reduced power consumption, and more efficient simultaneous processing of multiple tasks.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, the memory 44 comprises any one or more of SRAM, DRAM, EEPROM, and FLASH memory, which may be in the processing circuit 32 and/or separate from the processing circuit 32. In general, the memory 44 comprises one or more types of computer-readable storage media providing non-transitory storage of the computer program 46 and any configuration data 48 used by the network access node 30. The processing circuit 32 may be configured, e.g., through the use of appropriate program code stored in memory 44, to carry out one or more of the methods and/or signaling processes detailed hereinafter.

The network node 30 is configured, according to some embodiments, to operate as an access node of a wireless communications system that provides for a UE to measure its serving cell quality where the cell is transmitting signals in a beamforming manner. The processing circuit 32 is configured to transmit, in a first downlink signal having a series of subframes, a beam-formed reference signal in each of a plurality of subframes, where the beam-formed reference signals are transmitted in fewer than all of the subframes of the downlink signal. The beam-formed reference signals include a first subset and an at least partly differing second subset, where the first subset includes beam-formed reference signals corresponding to a first frequency or first localized range of frequencies, and the second subset includes beam-formed reference signals corresponding to a second frequency or second localized range of frequencies. By "localized range of frequencies" is meant that the range of frequencies is only a relatively small portion of available bandwidth, such that there is insignificant frequency selectivity in the radio channel across the range of frequencies. The second frequency or second localized range of frequencies is spaced apart from and differing from the first frequency or first localized range of frequencies. The processing circuit 32 is configured to configure a UE to perform mobility management measurements using at least the first subset of the beam-formed reference signals and to perform RLM using at least the second subset of the beam-formed reference signals. In some embodiments, processing circuit 32 is configured to transmit a first control channel using the same beamforming parameters used to transmit the beam-formed reference signals.

Regardless of the physical implementation, the processing circuit 32 is configured to perform, according to some embodiments, a method 800 in an access node of a wireless communications system, as shown in FIG. 8. The method 800 includes transmitting, in a first downlink signal having a series of subframes, a beam-formed reference signal in each of a plurality of subframes, where the beam-formed reference signals are transmitted in fewer than all of the subframes of the downlink signal (block 804). The beam-formed reference signals include a first subset and an at least partly differing second subset, the first subset includes beam-formed reference signals corresponding to a first frequency or first localized range of frequencies, and the second subset includes beam-formed reference signals corresponding to a second frequency or second localized range of frequencies. The second frequency or second localized range of frequencies is spaced apart from and differing from the first frequency or first localized range of frequencies. The method also includes configuring a UE to perform mobility management measurements using at least the first subset of the beam-formed reference signals and to perform RLM using at least the second subset of the beam-formed reference signals (block 802). The configuring may be performed prior to the transmitting, and the transmitting may include transmitting a first control channel using the same beamforming parameters used to transmit the beam-formed reference signals.

The beam-formed reference signals corresponding to the second frequency or second localized range of frequencies may have a periodicity in time that differs from a periodicity in time for the beam-formed reference signals corresponding to the first frequency or first localized range of frequencies. The second subset may further include beam-formed reference signals corresponding to a third frequency or third localized range of frequencies, the third frequency or third localized range of frequencies being spaced apart from and differing from the first and second frequencies or first and second localized range of frequencies.

In some cases, the beam-formed reference signals corresponding to the first frequency or first localized range of frequencies may each coincide in time with the beam-formed reference signals corresponding to the second frequency or second localized range of frequencies.

The method 800 may include transmitting one or more additional reference signals for use by the UE in estimating a channel for the first control channel and/or transmitting the first control channel in frequency resources at least partly overlapping frequency resources carrying the beam-formed reference signals. The beam-formed reference signals may include a beam-specific reference signal for a first beam. The beam-specific reference signal may carry a beam identifier, and the method 800 may include decoding the beam identifier from the beam-specific reference signal.

Another aspect of some embodiments is that the beam-formed reference signals are transmitted periodically and sparse in time, i.e., not in all subframes. However, the periodicity required for RLM may differ from the periodicity required for RRM measurements to trigger measurements reports. Therefore, in some embodiments the UE may only select some specific samples out of the transmitted RSs for RLM, where these sample/subframes are possibly configured by the network.

In some cases, for example, the UE is configured with a periodicity of beam-formed reference signals, and based on a pre-defined RLM periodicity in the standards, it performs the RRM measurements for RLM. In other cases, the UE is informed of both periodicities, i.e., one periodicity where signals are transmitted and a periodicity to be used for RLM matching its discontinuous reception (DRX) cycle.

The method 800 may include transmitting, to the UE, one or more first configuration parameters defining a periodicity and/or frequency location for the first subset of beam-formed reference signals. This method 800 may further include transmitting, to the UE, one or more second configuration parameters defining a periodicity and/or frequency location for the second subset of beam-formed reference signals.

Figure 9:
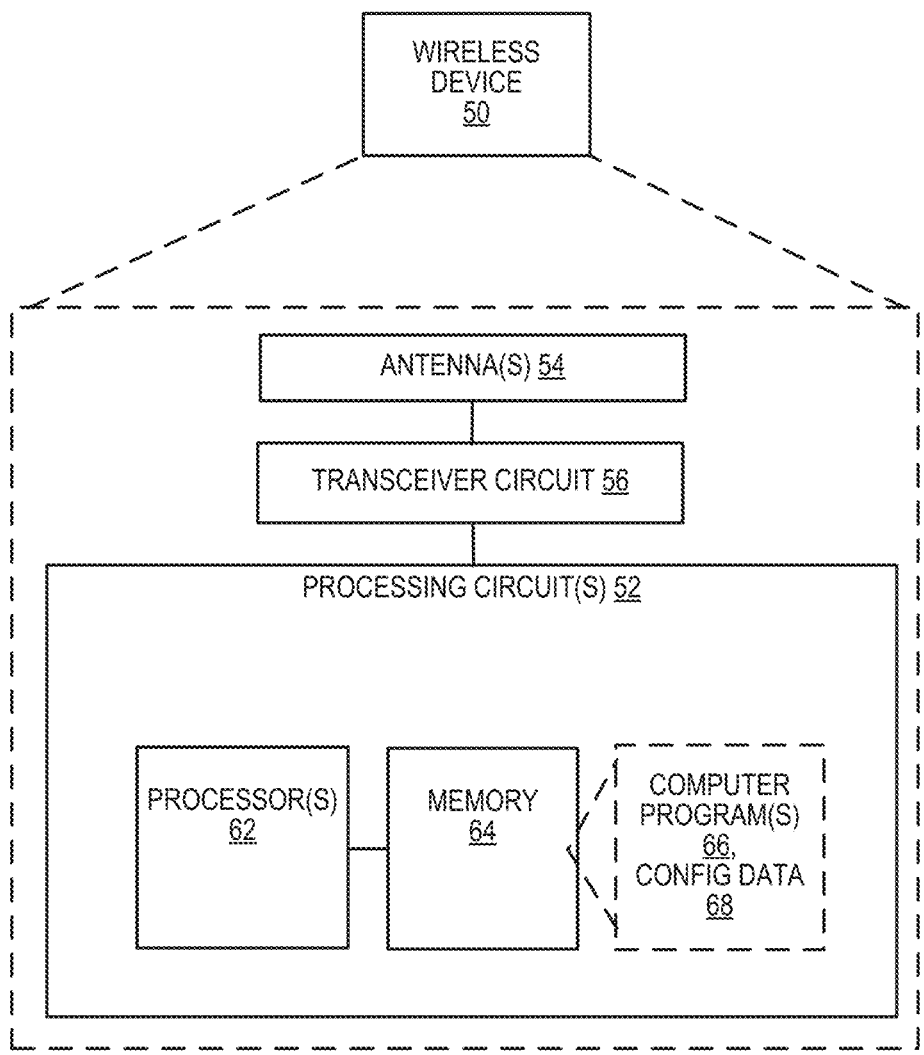
FIG. 9 is a block diagram of a UE, according to some embodiments.

FIG. 9 illustrates a diagram of the corresponding UE, shown as wireless device 50. The wireless device 50 may be considered to represent any wireless terminals that may operate in a network, such as a UE in a cellular network. Other examples may include a communication device, target device, device to device (D2D) UE, machine type UE or UE capable of machine to machine communication (M2M), a sensor equipped with UE, PDA (personal digital assistant), Tablet, mobile terminal, smart phone, laptop embedded equipped (LEE), laptop mounted equipment (LME), USB dongles, Customer Premises Equipment (CPE), etc.

The wireless device 50 is configured to communicate with a radio node or base station in a cellular network via antennas 54 and a transceiver circuit 56. The transceiver circuit 56 may include transmitter circuits, receiver circuits, and associated control circuits that are collectively configured to transmit and receive signals according to a radio access technology, for the purposes of using cellular communication services. This radio access technology is NR for the purposes of this discussion.

The wireless device 50 also includes one or more processing circuits 52 that are operatively associated with the radio transceiver circuit 56. The processing circuit 52 comprises one or more digital processing circuits, e.g., one or more microprocessors, microcontrollers, DSPs, FPGAs, CPLDs, ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50. The processing circuit 52 may be configured, e.g., through the use of appropriate program code stored in memory 64, to carry out one or more of the methods and/or signaling processes detailed hereinafter.

The wireless device 50 is configured, according to some embodiments, to measure a serving cell quality where the cell is transmitting signals in a beamforming manner. Accordingly, the processing circuit 52 is configured to receive, in a downlink signal having a series of subframes, a beam-formed reference signal in each of a plurality of subframes, where the beam-formed reference signals are received in fewer than all of the subframes of the downlink signal. The processing circuit 52 is also configured to perform mobility management measurements using at least a first subset of the received beam-formed reference signals, the first subset corresponding to a first frequency or first localized range of frequencies. The processing circuit 52 is also configured to perform RLM using a second subset of the received beam-formed reference signals, the second subset at least partly differing from the first subset and including beam-formed reference signals corresponding to a second frequency or second localized range of frequencies. The second frequency or second localized range of frequencies is spaced apart from and differing from the first frequency or first localized range of frequencies.

Figure 10:
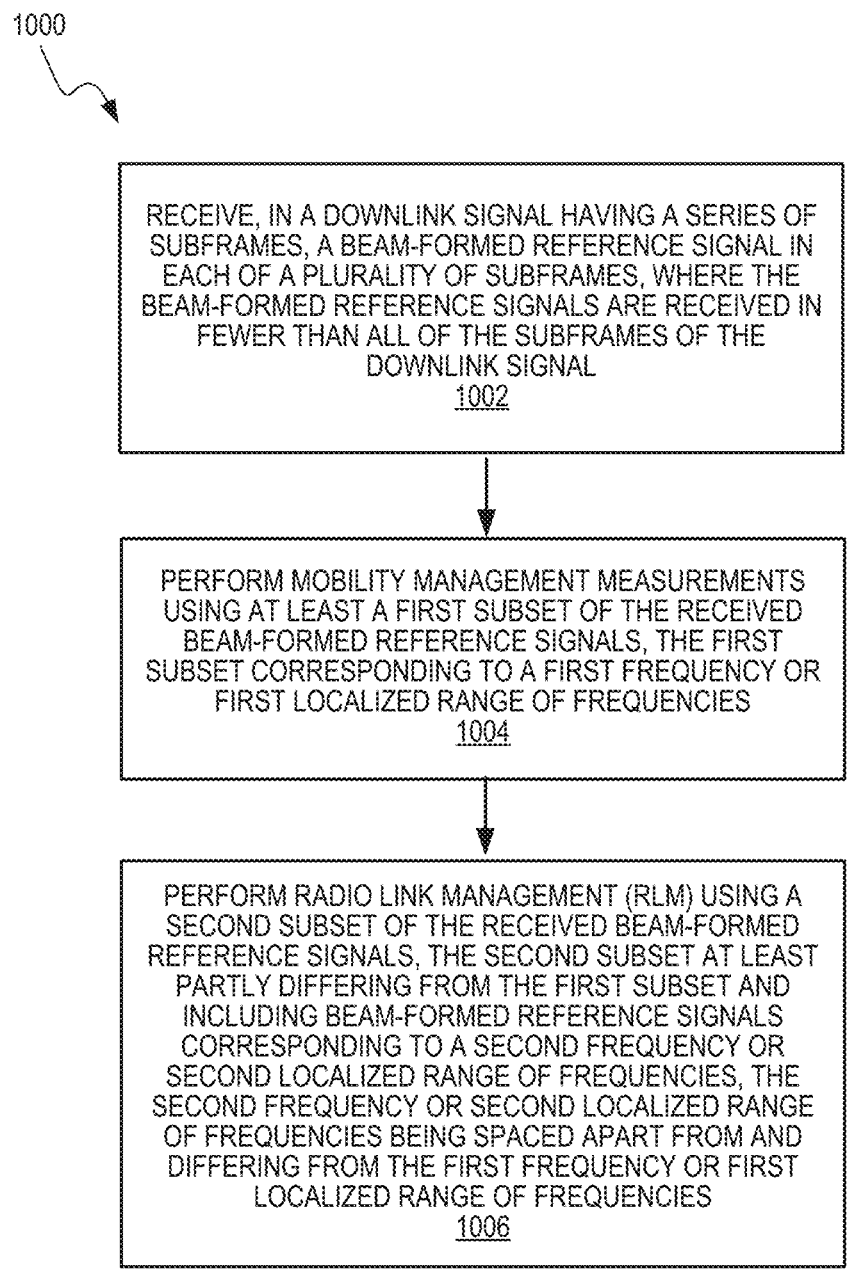
FIG. 10 illustrates a method in the UE, according to some embodiments.

According to some embodiments, the processing circuit 52 is configured to perform a corresponding method 1000, shown in FIG. 10, that includes receiving, in a downlink signal having a series of subframes, a beam-formed reference signal in each of a plurality of subframes, where the beam-formed reference signals are received in fewer than all of the subframes of the downlink signal (block 1002). The method 1000 also includes performing mobility management measurements using at least a first subset of the received beam-formed reference signals, the first subset corresponding to a first frequency or first localized range of frequencies (block 1004). The method 1000 further includes performing RLM using a second subset of the received beam-formed reference signals, the second subset at least partly differing from the first subset and including beam-formed reference signals corresponding to a second frequency or second localized range of frequencies (block 1006). The second frequency or second localized range of frequencies is spaced apart from and differing from the first frequency or first localized range of frequencies.

In some cases, the beam-formed reference signals corresponding to the second frequency or second localized range of frequencies have a periodicity in time that differs from a periodicity in time for beam-formed reference signals corresponding to the first frequency or first localized range of frequencies. The second subset may include beam-formed reference signals corresponding to a third frequency or third localized range of frequencies, the third frequency or third localized range of frequencies being spaced apart from and differing from the first and second frequencies or first and second localized range of frequencies. The beam-formed reference signals may correspond to the first frequency or first localized range of frequencies each coinciding in time with the beam-formed reference signals corresponding to the second frequency or second localized range of frequencies.

Performing RLM may include performing one or more measurements using the at least some of the same beam-formed reference signals to obtain a metric, and comparing the metric to a threshold that represents a predetermined downlink control channel quality, given an assumption that a hypothetical control channel corresponding to the control channel quality is transmitted using the same beamforming properties applied to the beam-formed reference signals. The method 1000 may include demodulating a first control channel using one or more additional reference signals to estimate a channel for the first control channel. The first control channel may be received in frequency resources at least partly overlapping frequency resources carrying the beam-formed reference signals used for performing RLM.

Performing RLM may also include determining that the UE is in-sync or out-of-sync, based on measurements of the at least some of the same beam-formed reference signals.

In some cases, the at least some of the same beam-formed reference signals comprise a beam-specific reference signal for a first beam, and performing RLM may include performing RLM for the first beam, using the beam-specific reference signal. The beam-specific reference signal may carry a beam identifier, and the method 1000 may include decoding the beam identifier from the beam-specific reference signal.

The method 1000 may also include receiving, prior to performing said mobility management measurements, one or more first configuration parameters defining a periodicity and/or frequency location for the first subset of beam-formed reference signals. The method 1000 may further include receiving, prior to performing said RLM, one or more second configuration parameters defining a periodicity and/or frequency location for the second subset of beam-formed reference signals.

The problem and techniques describing the solution will be further explained. As seen in the example configuration shown in FIG. 11, the transmission of the RSs used for mobility can be configured sparsely for RRM and synchronization functions, in the time and frequency domains. For example, the RSs used for mobility can be transmitted on six adjacent PRBs in every fifth subframe, as illustrated in FIG. 11.

However, such a time-frequency resource granularity of MRSs in the serving MRS set is not as abundant as the PDCCH occasions on the resource grid. The number of measurement samples during the RLM procedure should be sufficiently large to capture the quality of the time/frequency resources where the downlink control channel is transmitted. Therefore, the samples should be taken on many subcarriers throughout the downlink transmission bandwidth. The frequency allocation of serving MRSs used for RLM can be based on a localized or a distributed scheme for the downlink control channels. A localized scheme may require fewer UE computations, whereas a distributed scheme may provide better accuracy in frequency-selective channels.

Figure 11:
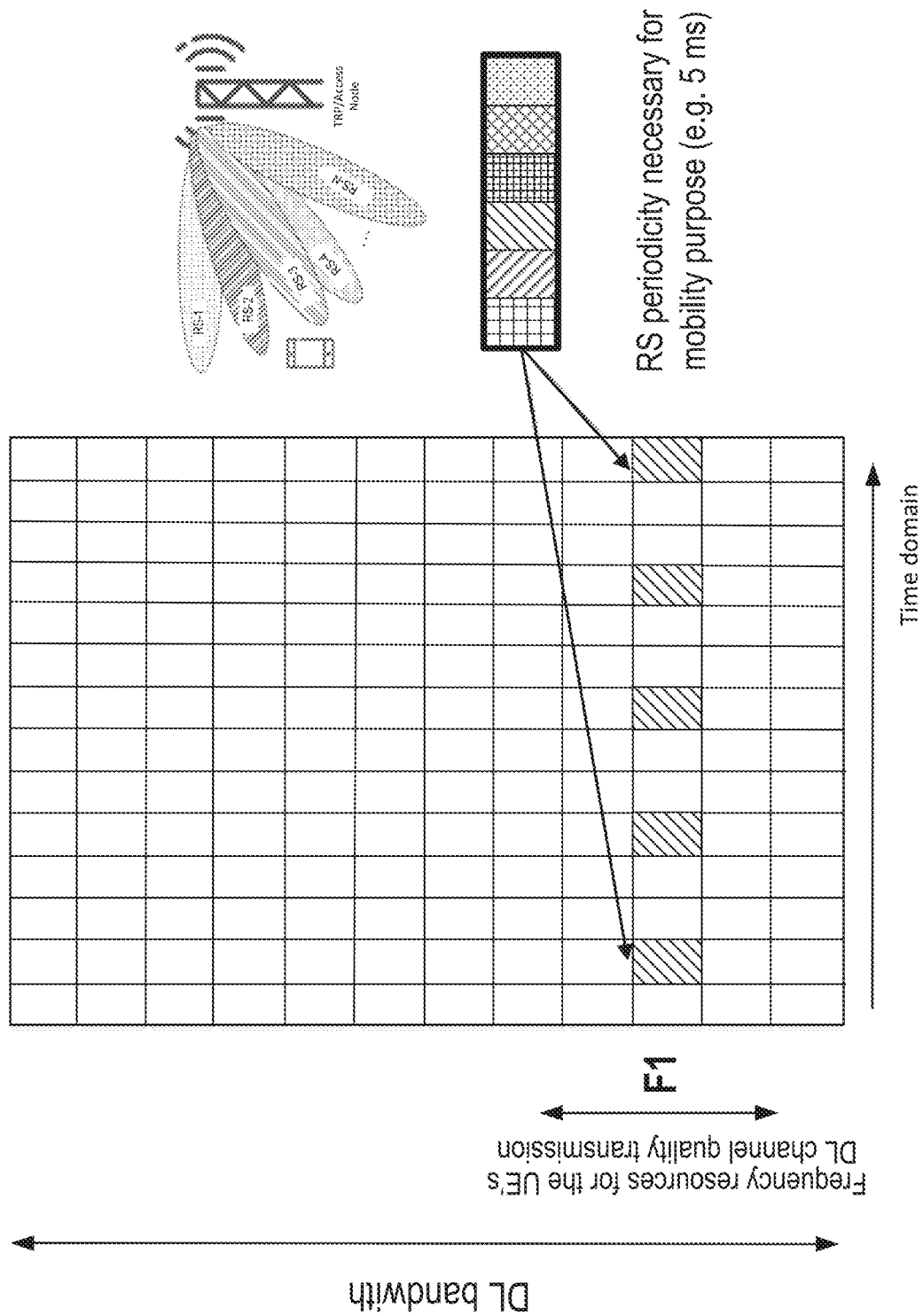
FIG. 11 is a diagram illustrating that RSs used for mobility can be transmitted on six adjacent PRBs in every fifth subframe, according to some embodiments.

As suggested by the example shown in FIG. 11, to fulfill requirements for RRM measurements, the mobility RSs have been envisioned to be a narrow band signal, e.g., occupying only six central PRBs. On the other hand, the downlink control channel can either be transmitted in the whole band (as in the case of the LTE PDCCH) or localized/distributed (as in the case of LTE ePDCCH).

In the case of localized downlink control channels, the MRSs may be transmitted in some representative PRBs whose quality is correlated with the quality of the PRBs where the downlink control of the UE would be transmitted. However, in the case of a non-localized/distributed downlink control channel, this technique may provide some inaccuracies in the sense that while the MRS bandwidth is confined to a limited number of PRBs, the frequency allocation of the downlink control channel may extend to much wider bandwidths, such that there might be a limited accuracy of the downlink control channel quality estimation based on the relatively narrowband mobility RSs.

Embodiments of the techniques and apparatus disclosed herein address this problem, and include a method at a UE and a network radio access node where the UE performs RLM in a system with beamforming by performing RRM measurements based on a new signal that is a version of the same periodic reference signals configured to support connected mode mobility (MRSs), but repeated in the frequency domain in the frequency resources where the downlink control channel of a given UE would be transmitted. These multiple versions of the MRSs may also be transmitted in different subframes, to provide some additional time domain diversity and/or to enable the beamforming transmission to be equivalent.

One advantage of this approach is that instead of creating a large overhead by transmitting MRSs over much more frequency resources, this approach leverages the fact that the RLM periodicity requirements is larger than the mobility requirements, allowing for sparser reference signals to be used for RLM. Thus, the replicated versions of the MRS are transmitted more sparsely in the time and frequency domains than the MRSs, reducing the overhead and/or the static interference caused by the RSs. Another advantage is that the replicated RSs used only for RLM purposes can be switched off once there are no active UE's in the cell. Overall, this approach ensures that UEs can take more accurate RLM measurements over a large range of time-frequency resources, without introducing a static/always-on periodic RS in the network.

Other advantages include that the signaling overhead is maintained at a low level, without compromising the accuracy of RLM measurements, especially during data inactivity. This is expected to be an important requirement in 5G NR. Further, these techniques provide accurate RLM also when the downlink control channel frequency allocation is extended over a larger bandwidth than that defined for MRSs.

According to the presently disclosed techniques, then, the wireless device (e.g., UE) performs RRM measurements for RLM using RSs distributed over multiple, spaced apart, frequency resources, instead of using only a single localized set of resource blocks. To support this, the UE in some embodiments is provided with two types of configurations for RSs of the same type. This may be done, e.g., using the Radio Resource Configuration (RRC) protocol, e.g., via a RRC Connection Re-Configuration message. First, the UE is provided with a mobility configuration, which specifies the frequency resources, such as PRBs in which the MRSs are transmitted with periodicity T_mobility, as well as the time-domain resources, e.g., the subframes, in which these are transmitted. The UE can then measure the MRSs in these resources as needed for mobility purposes. Second, the UE is provided with an RLM configuration, which specifies the additional frequency resources, e.g., PRBs, in which the MRSs are transmitted with periodicity T_RLM, as well as the time-domain resources, e.g., subframes, in which these additional MRSs are transmitted. The UE can then use any or all of the MRSs in these additional time-frequency resources (as well as those specified in the mobility configuration) for RLM purposes.

Note that in some embodiments there may be a sub-configuration where these additional MRSs are transmitted in the same subframes (or any other time resource indicated) as the ones used for mobility, but possibly with different periodicity.

Figure 12:
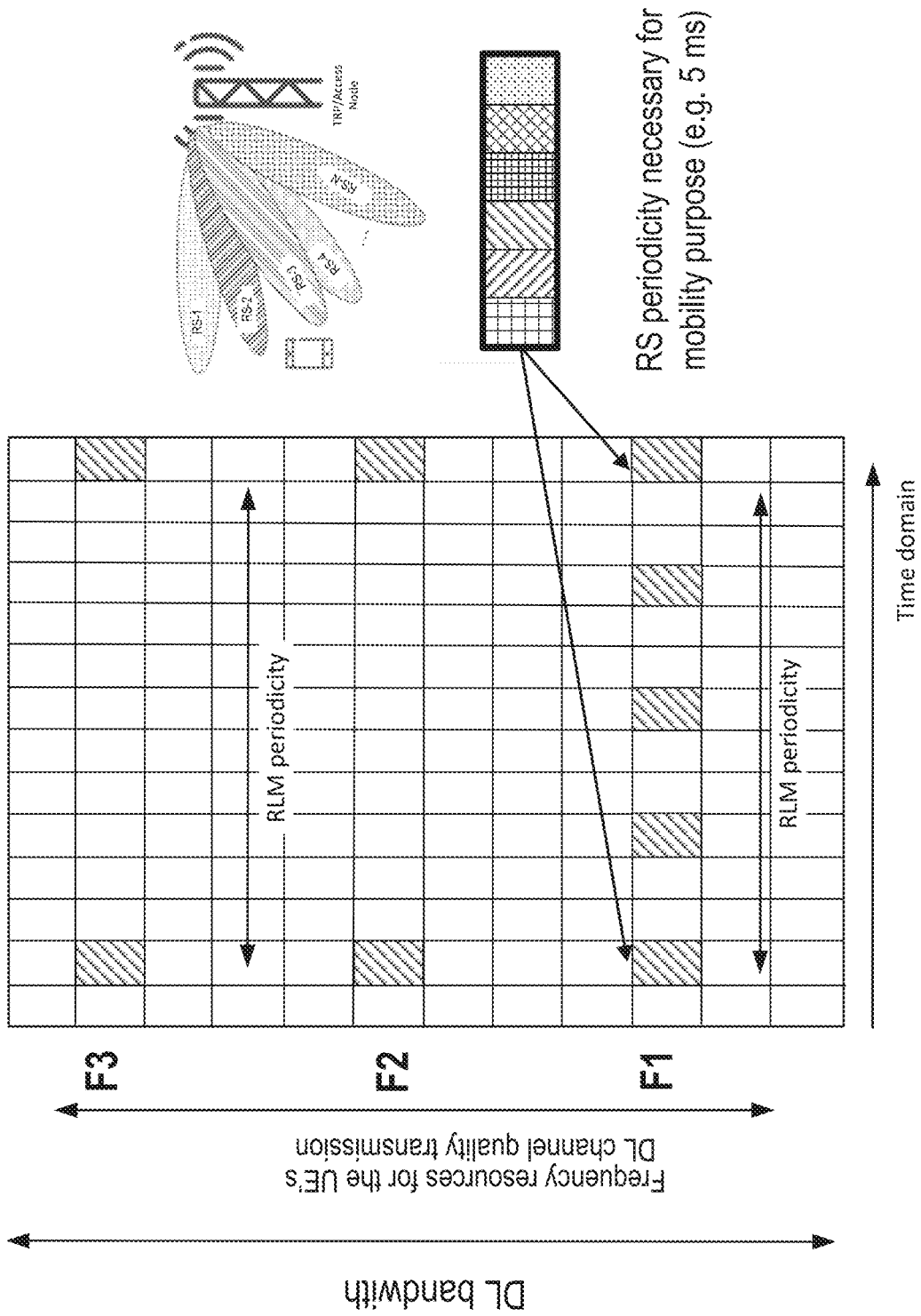
FIG. 12 is a diagram illustrating another example of how the MRSs may be transmitted, to support both mobility measurements and RLM, according to some embodiments.

FIG. 12 illustrates an example of how the MRSs may be transmitted, to support both mobility measurements and RLM. In the illustrated example, MRSs are transmitted in frequency resources localized at F1, at a relatively short periodicity, e.g., 5 milliseconds, for mobility measurement purposes. The UE may be configured with configuration information specifying these time-frequency resources, e.g., with a parameter specifying F1, a parameter indicating a 5 milliseconds periodicity, etc., and then use the RSs transmitted in these time-frequency resources for mobility measurements. Note that F1, F2, F3, etc., may indicate a set or range of subcarriers in some embodiments. For example, the MRSs may occupy six adjacent PRBs at each of the locations in the frequency band indicated by F1, F2, and F3 in the figure. Configuration parameters provided to the UE, e.g., by RRC signaling, may indicate a center frequency, lower frequency, or some other pointer to a frequency position or range, and may, in some embodiments, even indicate a bandwidth across which a localized group of RSs are transmitted.

In FIG. 12, the RSs at F1 are provided for mobility measurement purposes, and have a periodicity sufficient for these purposes. The example configuration shown in FIG. 12 also includes additional RSs, of the same type, but at different frequencies F2 and F3, and with a different periodicity. The extended periodicity, here shown as four times the period of the RS periodicity for mobility purposes, reflects the fact that RLM requires less frequent measurements. Placing these RSs at different frequencies, however, allows for the RLM to be more accurately correlated with downlink control channel transmissions, e.g., in the case where the downlink control channel or control channel search space is distributed across the frequency band.

Figure 13:
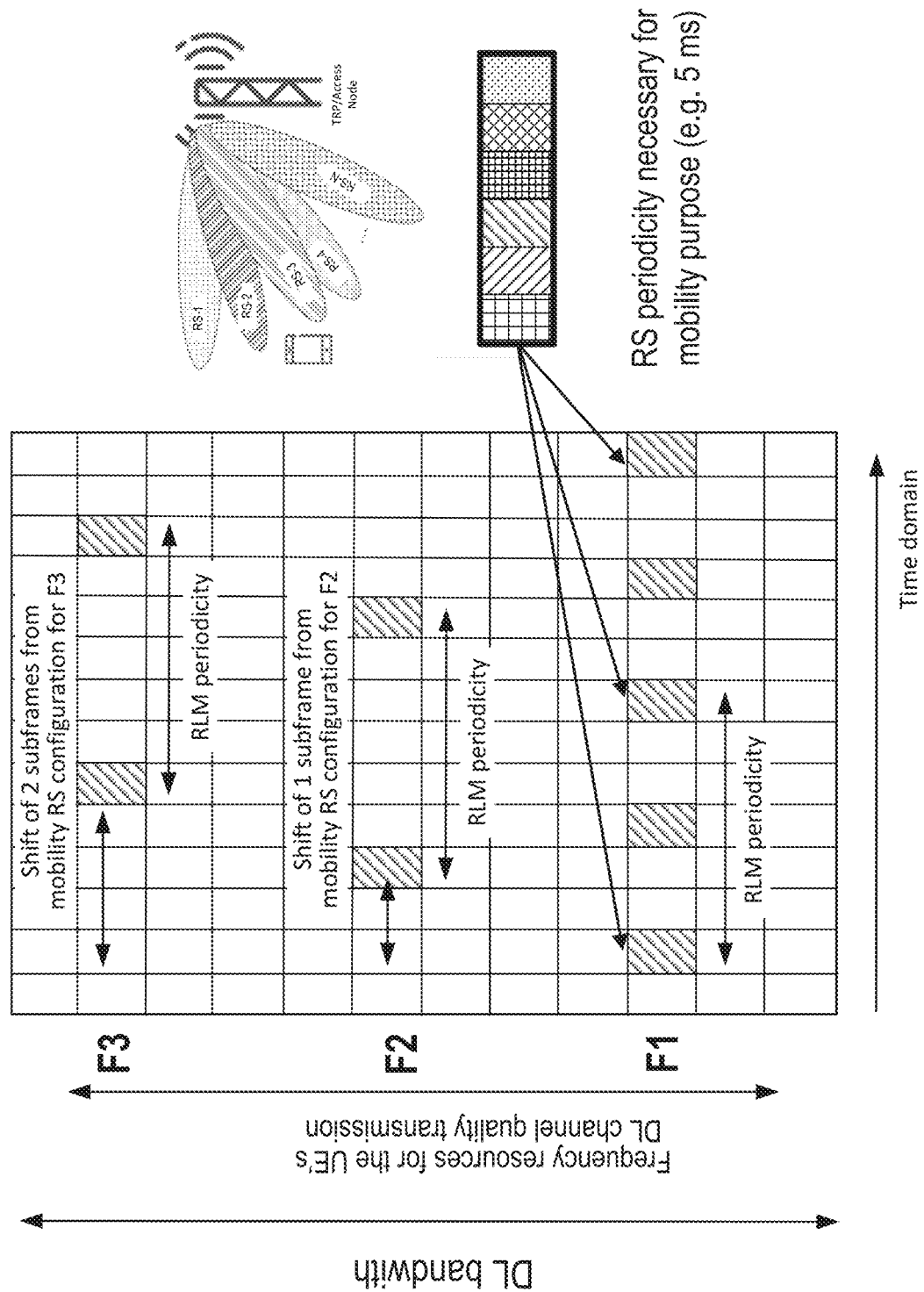
FIG. 13 is a diagram illustrating an example where the additional RSs at F2 and F3 are offset from one another, according to some embodiments.

Note that while it may be convenient in some embodiments for the periodicity of the additional RSs to be an integer multiple of the RSs used for mobility purposes, this is not necessarily the case. Also, while the additional RSs at F2 and F3 in FIG. 12 are shown as coinciding in time with some of the RSs at F1, this again is not necessarily the case—these may be offset in time, in some embodiments. This is the case with the example configuration shown in FIG. 13. Further, these additional RSs need not even coincide in time with one another—this is also shown in FIG. 13, where the additional RSs at F2 and F3 are offset from one another by two subframes. Still further, these additional RSs need not even have the same periodicity, at different frequencies. Thus, for example, the RSs at F2 may have a different periodicity than those at F3.

One aspect of the techniques described above is that the network transmits the RSs to be used for RLM in frequency resources that are correlated (i.e., overlapping or closely corresponding in frequency) with those where the downlink control channel is being transmitted. Thus, if the RSs are transmitted using the same beamforming properties as those applied to the downlink control channel, the result is that the RS quality is both correlated in the directional domain (which might be referred to as "the beam domain") and in the frequency domain, regardless of any further time averaging that may occur.

Figure 14:
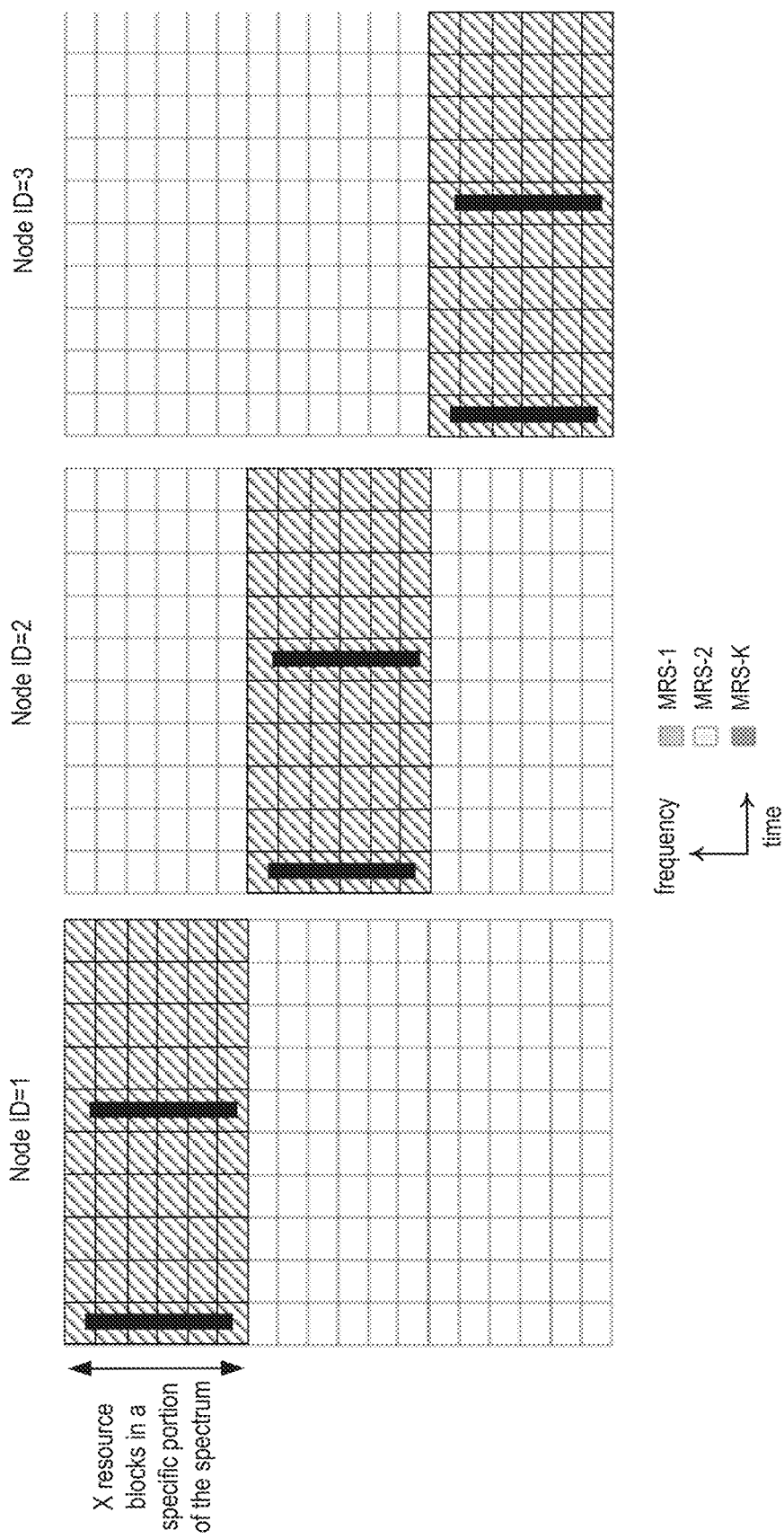
FIG. 14 is a diagram illustrating that the configuration of six different physical resource block (PRB) allocations for the serving MRS set can be different for different access nodes and matched to different access node IDs, according to some embodiments.

The transmission of the RSs used for mobility can be configured sparsely for RRM and synchronization functions in the time and frequency domains. For example, the RSs used for mobility can be transmitted on six adjacent PRBs in every fifth subframe, as illustrated in FIG. 14.

For the mobility RSs transmitted in one or several beams, different embodiments can define the information for the signal carriers, for example, in terms of the identifiers.

In one case, different RSs are transmitted in the beams and each one carries its own beam identifier (ID). They can then be called beam-specific RS (BRS) and the UE could perform RLM per beam. That is, the UE can measure a metric, e.g., the reference signal received power (RSRP) or the signal-to-interference-plus-noise ratio (SINR) per individual beam equivalent to the quality of the transmission of the downlink control channel in that specific beam.

In a second case, the same RSs are transmitted in the beams and each one carries the same identifier, which can either be a beam identifier (BID), a group identifier that can be a cell identifier Cell ID (CID) or both a beam ID+cell ID. In this case, the UE distinguishes beams in the time domain and/or simply performs some averaging over beams carrying the same identifier.

In one aspect, the network transmits these RSs to be used for RLM in correlated frequency resources where the downlink control channel is being transmitted so that the RS quality is correlated in the frequency domain despite further time averaging that may occur. If the downlink control channel is transmitted in the same beam(s) as the RSs used for RLM, the RS quality is correlated in the directional domain (beam domain) as well.

In another aspect, because the RSs used for mobility has its transmission periodic and sparse in time (i.e. not in all subframes), the periodicity required for RLM may differ from the periodicity required for RRM measurements to trigger measurements reports. Therefore, the UE may only select some specific samples out of the transmitted RSs where these sample/subframes are possibly configured by the network. Alternatively, the periodicity of the RS used for RLM may be shorter than the periodicity of the RS used for mobility.

The techniques described herein provide a configurable and dynamic method to perform reference signal measurements for the RLM function at UEs, without violating the lean signaling principles of 3GPP 5G NR. An important advantage enabled by these techniques is an improved efficiency at which the network can flexibly configure a limited number of sparse reference signals for different deployment (e.g., number of beams) and traffic (e.g., number of users, data activity/inactivity) scenarios.

As discussed in detail above, the techniques described herein, e.g., as illustrated in the process flow diagrams of FIGS. 8 and 10, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 15:
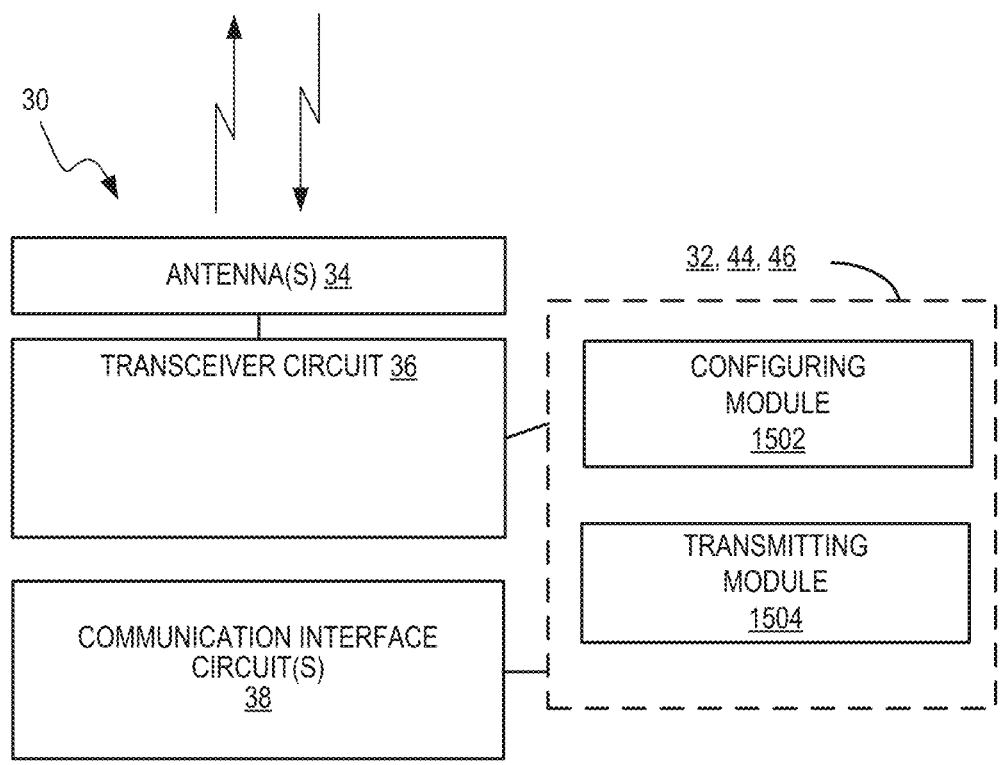
FIG. 15 is a block diagram illustrating a functional implementation of a network node, according to some embodiments.

FIG. 15 illustrates an example functional module or circuit architecture as may be implemented in an access node of a wireless communication network, such as in network node 30. The functional implementation includes a transmitting module 1504 for transmitting, in a downlink signal having a series of subframes, a beam-formed reference signal in each of a plurality of subframes, where the beam-formed reference signals are transmitted in fewer than all of the subframes of the downlink signal, and where the beam-formed reference signals include a first subset and an at least partly differing second subset. The first subset includes beam-formed reference signals corresponding to a first frequency or first localized range of frequencies, and the second subset includes beam-formed reference signals corresponding to a second frequency or second localized range of frequencies. The second frequency or second localized range of frequencies being spaced apart from and differing from the first frequency or first localized range of frequencies. The implementation also includes a configuring module 1502 for configuring a UE to perform mobility management measurements using at least the first subset of the beam-formed reference signals and to perform RLM using at least the second subset of the beam-formed reference signals. The transmitting module 1504 is also for transmitting a first control channel using the same beamforming parameters used to transmit the beam-formed reference signals.

Figure 16:
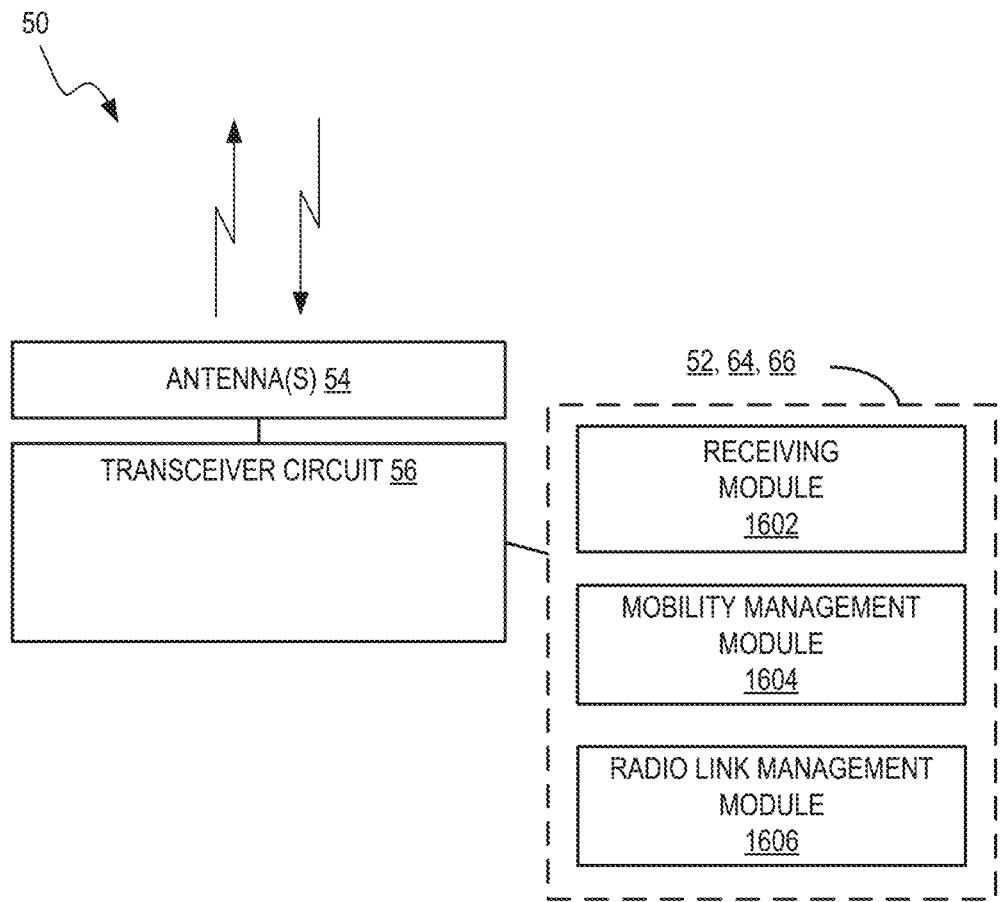
FIG. 16 is a block diagram illustrating a functional implementation of a wireless device, according to some embodiments.

FIG. 16 illustrates an example functional module or circuit architecture as may be implemented in a wireless device 50 adapted for operation in a wireless communication network. The implementation includes a receiving module 1602 for receiving, in a downlink signal having a series of subframes, a beam-formed reference signal in each of a plurality of subframes, where the beam-formed reference signals are received in fewer than all of the subframes of the downlink signal. The implementation also includes a mobility management module 1604 for performing mobility management measurements using at least a first subset of the received beam-formed reference signals, the first subset corresponding to a first frequency or first localized range of frequencies and a radio link monitoring module 1606 for performing RLM using a second subset of the received beam-formed reference signals. The second subset at least partly differs from the first subset and includes beam-formed reference signals corresponding to a second frequency or second localized range of frequencies. The second frequency or second localized range of frequencies is spaced apart from and differing from the first frequency or first localized range of frequencies.

What is claimed is:

1. A method, in an access node of a wireless communications system, the method comprising:
transmitting, in a downlink signal having a series of subframes, a beam-formed reference signal in each of a plurality of subframes, wherein the beam-formed reference signals are transmitted in fewer than all of the subframes of the downlink signal, and wherein the beam-formed reference signals include a first subset and an at least partly differing second subset, the first subset including beam-formed reference signals corresponding to a first frequency or first localized range of frequencies, and the second subset including beam-formed reference signals corresponding to a second frequency or second localized range of frequencies, the second frequency or second localized range of frequencies being spaced apart from and differing from the first frequency or first localized range of frequencies; and
configuring a user equipment (UE) to perform mobility management measurements using at least the first subset of the beam-formed reference signals and to perform radio link monitoring (RLM) using at least the second subset of the beam-formed reference signals, wherein performing RLM comprises monitoring the downlink signal for radio link failure (RLF).

2. The method of claim 1, wherein the beam-formed reference signals corresponding to the second frequency or second localized range of frequencies have a periodicity in time that differs from a periodicity in time for the beam-formed reference signals corresponding to the first frequency or first localized range of frequencies.

3. The method of claim 1, wherein the second subset further includes beam-formed reference signals corresponding to a third frequency or third localized range of frequencies, the third frequency or third localized range of frequencies being spaced apart from and differing from the first and second frequencies or first and second localized range of frequencies.

4. The method of claim 1, wherein the beam-formed reference signals corresponding to the first frequency or first localized range of frequencies each coincide in time with the beam-formed reference signals corresponding to the second frequency or second localized range of frequencies.

5. The method of claim 1, wherein the method comprises transmitting one or more additional reference signals for use by the UE in estimating a channel for a first control channel.

6. The method of claim 1, wherein the method comprises transmitting a first control channel using the same beam-forming parameters used to transmit the beam-formed reference signals, in frequency resources at least partly overlapping frequency resources carrying the beam-formed reference signals.

7. The method of claim 1, wherein one or more of the beam-formed reference signals comprises a beam-specific reference signal for a first beam.

8. The method of claim 7, wherein the beam-specific reference signal carries a beam identifier.

9. The method of claim 1, wherein the method comprises transmitting, to the UE, one or more first configuration parameters defining a periodicity and/or frequency location for the first subset of beam-formed reference signals.

10. The method of claim 9, wherein the method comprises transmitting, to the UE, one or more second configuration parameters defining a periodicity and/or frequency location for the second subset of beam-formed reference signals.

11. An access node of a wireless communications system, comprising:
transceiver circuitry; and
processing circuitry operatively associated with the transceiver circuitry and configured to:
transmit, using the transceiver circuitry, in a downlink signal having a series of subframes, a beam-formed reference signal in each of a plurality of subframes, wherein the beam-formed reference signals are transmitted in fewer than all of the subframes of the downlink signal, and wherein the beam-formed reference signals include a first subset and an at least partly differing second subset, the first subset including beam-formed reference signals corresponding to a first frequency or first localized range of frequencies, and the second subset including beam-formed reference signals corresponding to a second frequency or second localized range of frequencies, the second frequency or second localized range of frequencies being spaced apart from and differing from the first frequency or first localized range of frequencies; and configure a user equipment (UE) to perform mobility management measurements using at least the first subset of the beam-formed reference signals and to perform radio link monitoring (RLM) using at least the second subset of the beam-formed reference signals, wherein performing RLM comprises monitoring the downlink signal for radio link failure (RLF).

\* \* \* \* \*